United States Patent
McHale, Jr. et al.

(10) Patent No.: US 8,067,323 B2
(45) Date of Patent: Nov. 29, 2011

(54) SINTERED COMPACT

(75) Inventors: James Michael McHale, Jr., Hillsborough, NJ (US); Rejeev Tirumala Pakalapati, Columbus, OH (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 13/093,026

(22) Filed: Apr. 25, 2011

(65) Prior Publication Data

US 2011/0209414 A1    Sep. 1, 2011

Related U.S. Application Data

(62) Division of application No. 11/062,199, filed on Feb. 18, 2005, now Pat. No. 7,932,199.

(60) Provisional application No. 60/546,669, filed on Feb. 20, 2004.

(51) Int. Cl.
| | |
|---|---|
| C04B 35/00 | (2006.01) |
| C04B 35/52 | (2006.01) |
| C04B 35/56 | (2006.01) |
| B24D 3/02 | (2006.01) |
| C09C 1/68 | (2006.01) |
| C09K 3/14 | (2006.01) |

(52) U.S. Cl. ........ 501/96.4; 501/89; 501/97.4; 501/127; 501/153; 51/307; 51/309

(58) Field of Classification Search .......... 51/297, 51/307, 309; 501/96.4, 96.5, 97.2, 97.4, 501/98.3, 89, 127, 153; 264/604, 626
See application file for complete search history.

(56) References Cited

U.S. PATENT DOCUMENTS

| | | | |
|---|---|---|---|
| 3,743,489 | A | 7/1973 | Wentorf, Jr. et al. |
| 4,334,928 | A | 6/1982 | Hara et al. |
| 4,343,651 | A | 8/1982 | Yazu et al. |
| 4,389,465 | A | 6/1983 | Nakai et al. |
| 4,619,698 | A | 10/1986 | Ueda et al. |
| 4,666,466 | A | 5/1987 | Wilson |
| 4,906,528 | A | 3/1990 | Cerceau et al. |
| 4,907,377 | A | 3/1990 | Csillag et al. |
| 4,911,756 | A | 3/1990 | Nakai et al. |
| 5,034,053 | A | 7/1991 | Nakai et al. |
| 5,041,399 | A | 8/1991 | Fukaya et al. |
| 5,328,875 | A | 7/1994 | Ueda et al. |
| 5,466,642 | A | 11/1995 | Tajima et al. |
| 5,830,813 | A | 11/1998 | Yao et al. |
| 6,331,497 | B1 | 12/2001 | Collier et al. |
| 6,814,775 | B2 | 11/2004 | Scurlock et al. |
| 2004/0002418 | A1 | 1/2004 | Scurlock et al. |

FOREIGN PATENT DOCUMENTS

| | | |
|---|---|---|
| EP | 0626237 | 8/1996 |
| JP | 59153851 | 9/1984 |
| JP | 60086225 | 5/1985 |
| JP | 782031 | 3/1995 |
| JP | 07133154 | 5/1995 |
| JP | 08109070 | 4/1996 |
| JP | 08253837 | 10/1996 |
| JP | 2000218411 | 8/2000 |
| JP | 8126903 | 9/2000 |
| JP | 2000247746 | 9/2000 |

*Primary Examiner* — Anthony Green
*Assistant Examiner* — Pegah Parvini
(74) *Attorney, Agent, or Firm* — Maria C. Gasaway

(57) ABSTRACT

A sintered cubic boron nitride (cBN) compact for use in a tool is obtained by sintering a mixture of (i) cubic boron nitride, (ii) aluminum oxide, (iii) one or more refractory metal compounds, and (iv) aluminum and/or one or more non-oxide aluminum compounds. The sintered bodies may have sufficient strength and toughness to be used as a tool material in solid, i.e. not carbide supported, form, and may be useful in heavy machining of cast irons.

10 Claims, 1 Drawing Sheet
(1 of 1 Drawing Sheet(s) Filed in Color)

SINTERED COMPACT

RELATED APPLICATIONS AND CLAIM OF PRIORITY

This application is a divisional of U.S. patent application Ser. No. 11/062,199 filed Feb. 18, 2005 now U.S. Pat. No. 7,932,199. This application claims priority to, and incorporates by reference, U.S. Provisional Patent Application No. 60/546,669, filed Feb. 20, 2004.

TECHNICAL FIELD

The description contained herein generally relates to cutting, milling, and/or turning tools. More particularly, the description generally relates to cubic boron nitride (cBN) superabrasive tools and methods for making and using them.

BACKGROUND

The hardness of cubic boron nitride (cBN) is greater than every known material other than diamond. cBN, however, is less reactive with ferrous materials than diamond. Consequently, it has become widely used in material removal applications on ferrous workpieces. Sintered polycrystalline cubic boron nitride (PCBN) materials are well known in the art and widely used in ferrous machining applications.

PCBN compacts can be divided into two broad classes of materials. The first class, which is characterized by the relatively high volume percentage of cBN of greater than or equal to 70%, is widely used in cast iron machining applications. For example, U.S. Pat. No. 3,743,489, incorporated herein by reference in its entirety, describes a tough cBN sintered body with direct bonding between cBN grains and metallic binders filling intergranular spaces. The second class is characterized by a lower cBN volume percentage (less than 70%) that is dispersed in a ceramic binder phase. An example of this second type, which is widely used in turning of hardened steels, can be found in U.S. Pat. No. 4,334,928 to Hara et al, incorporated herein by reference in its entirety. The ceramic binder phase can comprise carbides, nitrides, and/or borides of the metals of Groups IVa and Va of the periodic table. Both types of PCBN are commercially available in a solid unsupported form and in tungsten carbide supported form for the fabrication of cutting tools and tool inserts.

Despite the advances of the prior art, some varieties of cast irons, and in particular white irons, remain very difficult and costly materials to machine. In heavy machining operations on massive white iron castings, very large depths of cut are used, up to and exceeding 0.10 inches. These extreme machining conditions require exceptionally tough and wear resistant tool materials. The situation is further complicated by chemical and adhesive wear mechanisms between the tool and workpiece. Many cast irons contain elements that are more reactive than iron against cBN. For example, chromium is found in many white cast irons at levels up to 34 weight-%. This chemical wear mechanism places even more demands upon the tool material.

Currently, high cBN content PCBN in solid form is the most successful class of PCBN material used in heavy machining of cast irons. A commercially available example of such a material is AMB90 (available from Element Six). This material is comprised of about 90 volume-% cBN with 9 μm average grain size in an aluminum ceramic binder. Similarly, U.S. Pat. No. 4,666,466 to Wilson, incorporated herein by reference in its entirety, describes material prepared from a mixture of metallic aluminum and cBN powder reacted under high pressure and temperature conditions to form a sintered body with AlN and $AlB_2$ interspersed between cBN grains. This approach provides a material with relatively good toughness and abrasive wear resistance, but it does not adequately address the need for chemical and adhesive wear resistance that would be required in a truly optimal material for heavy machining of cast irons.

There are a number of references teaching various methods for improving the chemical wear resistance of high cBN content PCBN materials through modification of the binder phases. U.S. Pat. No. 4,343,651 to Yazu et al., incorporated herein by reference in its entirety, describes a PCBN composition with 80-95 volume-% cBN with a particle size of less that 10 μm sintered with a binder phase containing at least one binder material selected from the group consisting of a carbide, a nitride, and a carbonitride of a Group IVb and Vb transition metal in the periodic table, mixtures thereof and their solid solution compounds; and aluminum compounds, wherein the content of aluminum in the matrix is 5 to 30 weight-%, and wherein the particles in the matrix are of a size of less than one micron. U.S. Pat. No. 4,389,465 to Nakai et al., incorporated herein by reference in its entirety, describes a sintered compact consisting essentially of 20-80 volume-% cBN with a particle size less than 5 μm and the residual part consisting of $Al_2O_3$. U.S. Pat. No. 4,619,698 to Ueda et al., incorporated herein by reference in its entirety, describes a PCBN material with 75-97 weight-% cBN in a binder phase comprised of 1 to 20 weight % of TiC and/or TiCN and 1 to 20 weight-% of a compound selected from the group consisting of CoAl, NiAl, and (Co, Ni)Al.

As further examples, U.S. Pat. No. 4,911,756 to Nakai et al., incorporated herein by reference in its entirety, describes a sintered compact obtained by sintering a mixture containing about 50 to 75 percent by volume of cBN and about 25 to 50 percent of a binder that contains 20 to 50 weight-% of Al and 4 to 40 weight-% tungsten, with the remainder made up of carbides, nitrides, and carbonitrides of Groups IVa, Va or VIa of the periodic table.

U.S. Pat. No. 5,034,053 to Nakai et al., incorporated herein by reference in its entirety, describes a PCBN material containing 45-75% volume-% of cBN in a binder phase consisting of 5-25 percent by weight of Al and a remainder of at least one species of compounds represented by $(H_{1-z}M_z)$ C, wherein M is an element selected from the group consisting of Groups IVa, Va and VIa of the periodic table except for Hf, and wherein the condition $0<=z<=0.3$ is satisfied. U.S. Pat. No. 5,041,399 to Fukaya et al., incorporated herein by reference in its entirety describes a PCBN material obtained by sintering powder mixture containing 20-70 volume-% cBN and a binder powder comprised of 2-20 weight-% of aluminum, 2-20 weight-% of tungsten, and a remainder formed of one or more Ti compounds selected from a group consisting of $TiN_z$, $Ti(C,N)_z$, $TiCz$, $(Ti,M)N_z$, $(Ti,M)(C,N)_z$ and $(Ti,M) C_z$, where M represents a transition metal element or elements belonging to any one of the Groups IVa, Va and VIa of the periodic table excluding Ti, and wherein z is within the range of 0.1 to 0.4, the binder further containing the Al in the form of at least one of Al and a compound of Al and Ti, and the W in the form of at least one of W, WC and a compound of W and Ti, wherein the atomic ratio of the Ti to a transition metal element or metal elements belonging to any one of the Groups, VIa, Va and VIa of the periodic table including Ti is at least ⅔ and not more than 97/100, and wherein cBN crystals are bonded to each other through bonding phases formed by the binder in said sintered body.

U.S. Pat. No. 5,328,875 to Ueda et al., incorporated herein by reference in its entirety, describes a PCBN material wherein cBN grains are dispersed in a binder phase that consists of 20-48 volume-% of a decomposed reaction phase derived by the reaction of cBN and one or more of $Ti_{2-3}AlC$, $Ti_{2-3}AlN$, and $Ti_{2-3}AlCN$ including oxygen, the decomposed reaction phase comprising one or more of TiC, TiN, TiCN and one or more of $Al_2O_3$ and AlN, and $TiB_2$, and wherein the crystal grain size in the bonding phase and cBN is less than 1 micron.

U.S. Pat. No. 5,830,813 to Yao et al., incorporated herein by reference in its entirety, describes a method for making a PCBN material comprising the steps of: forming a mixture of cBN crystals, a refractory material powder selected from the group consisting of titanium carbonitride and titanium aluminum carbonitride, a source of cobalt and a source of aluminum; treating at least a portion of the ingredients of the mixture with ammonia at a temperature in the range of 1100° to 1250° C.; and sintering the mixture under high temperature, high pressure conditions.

U.S. Pat. No. 6,331,497 to Collier et al., incorporated herein by reference in its entirety, describes a cutting tool comprising a body of polycrystalline cBN with cBN grain size of 10 to 17 μm and a binder phase comprising 2 to 15 weight-% of a material selected from the group consisting of titanium diboride, aluminum diboride, titanium carbide, titanium nitride, titanium carbonitride, titanium aluminum carbonitride, and $(Ti_xM_y)CN$, wherein the alloying metal M may be one or more of silicon, chromium, cobalt, tungsten and tantalum and the proportion of alloying metal to titanium, y/x, is in the range of from 0.05 to 0.3; an infiltrant containing aluminum and/or silicon; and diamond more than stoichiometric with the silicon in the infiltrant for forming silicon carbide.

JP Patent Publication No. 07-082031, incorporated herein by reference in its entirety, discloses a cBN sintered compact consisting of 10-70 volume-% cBN in a binding phase consisting of 5-30 volume-% of alumina (aluminum oxide) with particle diameter of 1 micron or less, 3-20 volume-% of aluminum nitride/boride; 10-40 vol. % of Ti carbide/nitride, and 3-20 volume-% of Ti boride. This sintered compact is reported to be superior to conventional products with longer service life, i.e., improved fracture toughness, thermal shock resistance, chipping resistance, and oxidation resistance.

In JP Patent Publication No. 08-126903, incorporated herein by reference in its entirety, another cBN sintered body with improved wear resistance is disclosed. This cBN sintered body comprises 20-40 volume-% of Ti carbide/nitride, 1-5 volume-% of aluminum nitride, 3-7 volume-% of Ti boride, 3-15 volume-% of aluminum oxide, with the residual consisting of cBN, and wherein at least 60% of the area of the cBN grains are mutually bonded.

JP Patent Publication Nos. 2000-247746A and 2000-218411A, incorporated herein by reference in their entirety, disclose a PCBN material with 30-90 volume-% of a cBN with grain size below 1 μm, 10-70 volume-% of cBN with an average grain size of 2-10 μm, and 4-65 volume-% of a binder phase comprised of AlN, $Al_2O_3$, a boride of the metals of Groups IVa, Va, and/or VIa, a non-boride compound from the same groups of the periodic table, and at least one element from Group VII of the periodic table. Although the cBN mixture contains a portion of coarser particles, the volumetric average grain size of the final compact must be around 1 μm.

JP Patent Publication No. 08-109070A, incorporated herein by reference in its entirety, discloses a PCBN material with >85% being comprised of cBN and $Al_2O_3$, 30-80 volume-% cBN, and the remainder a binder phase comprised of titanium nitride, aluminum nitride, and unavoidable impurities. The cBN content in the final compact is between 30 and 80 volume-%.

JP Patent Publication No. 59-153851A, incorporated herein by reference in its entirety, discloses a PCBN material obtained by high pressure and temperature sintering of a mixture comprised of 50-70 weight-% cBN, 10-20 weight-% $Al_2O_3$, 8-18 weight-% TiN, 8-10 weight-% aluminum powder, and 2-4 weight-% silicon powder.

Thus, while improvements have been realized by the foregoing approaches, there is still a need for an optimized cutting tool material for heavy machining of iron castings. Described below is a PCBN material that has shown improved performance in machining cast irons.

SUMMARY

A sintered cubic boron nitride (cBN) compact for use in a tool is obtained by sintering a mixture of (i) cubic boron nitride, (ii) aluminum oxide, (iii) one or more refractory metal compounds, and (iv) aluminum and/or one or more non-oxide aluminum compounds. The sintered bodies have sufficient strength and toughness to be used as a tool material in solid, i.e. not carbide supported, form, and are especially useful in heavy machining of cast irons.

In accordance with one embodiment, a sintered cubic boron nitride (cBN) compact with a cBN portion and a non cBN portion for use in a tool is obtained by sintering a mixture of: (i) about 71 to about 93 weight-% of cBN; (ii) about 1 to about 20% of aluminum oxide; (iii) about 3 to about 26% by weight of one or more refractory metal compounds; and (iv) about 3 to about 20% by weight of a source of non-oxide aluminum compounds. The refractory metal compounds may include one or more compounds having the general formula $MZ_{(1-x)}$, where Z is selected from the group consisting of C, B, or N, or combination thereof, M is a metal from Groups IV-VI of the periodic table, and x is a number between 0.01 and 0.99. A second type of refractory metal compound may have the general formula $MC_{(1-x)}N_x$, such as $TiC_{(1-x)}N_x$. A third type of refractory metal compound includes a combination or solid solutions of two or more compounds having the formula MZ or $MZ_2$. The aluminum content in the non-cBN portion of the sintered compact may exceed about 30 weight-% of the entire compact, although other compositions are possible.

In another embodiment, a sintered cBN compact with a cBN portion and a non cBN portion for use in a tool is obtained by sintering a mixture of: (i) about 50 to about 93 weight-% of cBN nitride, optionally with a multimodal grain size distribution, (ii) about 1 to about 30% of aluminum oxide, (iii) about 3 to about 46% by weight of one or more refractory metal compounds such as carbides, nitrides, borides, and/or carbonitrides of Groups IV-VI of the periodic table, which may include mixtures and/or solid solutions thereof, and (iv) about 3 to about 30% by weight of a source of one or more non-oxide aluminum compounds, wherein the total aluminum content in the non cBN portion of the mixture exceeds about 10 weight-% of the compact.

Further embodiments relate to processes for making a sintered compact of the above-mentioned embodiments.

BRIEF DESCRIPTION OF THE DRAWINGS

The file of this patent contains at least one drawing executed in color. Copies of this patent with color drawings will be provided by the Patent and Trademark Office upon request and payment of necessary fee.

DETAILED DESCRIPTION

Figure 1:
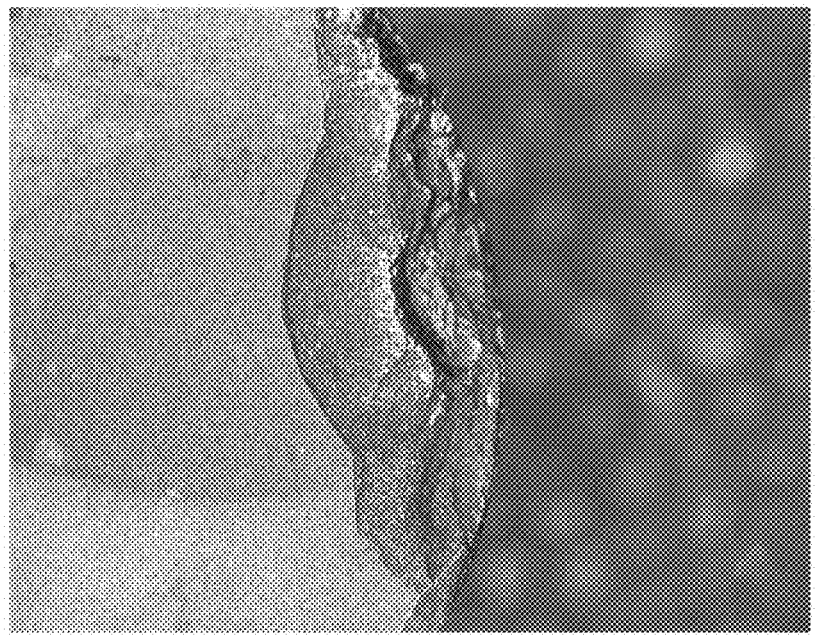
FIG. 1 is a photograph on the wear land of a prior art insert after machining a large industrial casting.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural references unless the context clearly dictates otherwise. Thus, for example, reference to a "metal" is a reference to one or more metals and equivalents thereof known to those skilled in the art, and so forth.

Unless defined otherwise, all technical and scientific terms used herein have the same meanings as commonly understood by one of ordinary skill in the art. Although any methods and materials similar or equivalent to those described herein may be used in the practice or testing of embodiments of the present invention, the preferred compositions, methods, devices, and materials are now described. All publications mentioned herein are incorporated by reference in their entirety. Nothing herein is to be construed as an admission that the invention is not entitled to antedate such disclosure by virtue of prior invention.

In accordance with one embodiment, a sintered cubic boron nitride (cBN) compact with a cBN portion and a non cBN portion for use in a tool is obtained by sintering a mixture of: (i) about 70 to about 93 weight-% of cBN; (ii) about 1 to about 20% of aluminum oxide; (iii) about 3 to about 26% by weight of one or more refractory metal compounds; and (iv) about 3 to about 20% by weight of a source of non-oxide aluminum compounds. The refractory metal compounds may include one or more compounds having the general formula $MZ_{(1-x)}$, where Z is selected from the group consisting of C, B, or N, or combination thereof, M is a metal from Groups IV-VI of the periodic table, and x is a number between 0.01 and 0.99. A second type of refractory metal compound may have the general formula $MC_{(1-x)}N_x$, such as $TiC_{(1-x)}N_x$. A third type of refractory metal compound includes a combination or solid solutions of two or more compounds having the formula $MZ$ or $MZ_2$. The compound may be a single compound or a combination of compounds, such as a mixture of at least two materials selected from the group of TiC, TiN, $TiB_2$, and $TiC_{(1-x)}N_x$. Other suitable compounds may also be used. The aluminum content in the non-cBN portion of the compact may comprise about 10 weight-% or more of the compact, although other compositions are possible. In an embodiment, the aluminum content in the non-cBN portion of the compact may comprise about 30 weight-% or more of the entire compact.

In another embodiment, the mixture may contain about 71 to about 93 weight-% of cBN, and in another embodiment the mixture may contain about 73 to about 93 weight-% of cBN. Similarly, in one embodiment the content of aluminum oxide may be about 3 to about 15%. Also, an embodiment of the mixture may contain about 8 to about 20% by weight of one or more refractory metal compounds. Further, an embodiment of the mixture may also contain about 3 to about 15% by weight of a source of non-oxide aluminum compounds. Other ranges of each of the materials in the mixture are possible.

In another embodiment, a sintered cBN compact with a cBN portion and a non cBN portion for use in a tool is obtained by sintering a mixture of: (i) about 50 to about 93 weight-% of cBN nitride, optionally with a multimodal grain size distribution, (ii) about 1 to about 30% of aluminum oxide, (iii) about 3 to about 46% by weight of one or more refractory metal compounds such as carbides, nitrides, borides, and/or carbonitrides of Groups IV-VI of the periodic table, which may include mixtures and/or solid solutions thereof, and (iv) about 3 to about 30% by weight of a source of non-oxide aluminum compounds, wherein the total aluminum content in the non cBN portion of the mixture exceeds about 10 weight-%. By way of example, in one embodiment, the carbides, nitrides, borides, and carbonitrides are carbonitrides may have formula $TiC_{(1-x)}N_x$, or they may include a mixture of at least two materials selected from the group of TiC, TiN, $TiB_2$, and $TiC_{(1-x)}N_x$. In each case, x is a number between 0.01 and 0.99.

In one variant, the cBN in the mixture may have a bimodal or multimodal grain size distribution. However, other distributions, such as substantially homogenous distributions and seemingly random distributions, are possible The mixture may be prepared and sintered by any suitable method. For example, the components may be mixed with a solvent and/or or another suitable mixing media. The mixing should occur for a suitable time to thoroughly mix the materials, such as one hour for a 1000 g jar of material. Powder blends can be mixed before sintering by a variety of techniques, including, but not limited to, for example, ultrasonic mixing, ball mill mixing, attrition mill mixing, and the like. The choice of mixing technique may be influenced by the desire to introduce certain materials into the mixture or keep certain materials out of the mixture. Examples of such materials may include debris from the milling media balls (e.g., tungsten carbide debris from WC milling balls). Accordingly, in embodiments where tungsten carbide (which is a member of Group VI of the periodic table) is an ingredient, milling with tungsten carbide media may be used to introduce at least a fraction of the tungsten carbide content. The non-oxide aluminum may originate from a foil or other solid form of metallic aluminum placed in contact with a powder mixture during sintering.

Milling (i.e. mixing) may often conducted in the presence of or more solvents such as, for example, isopropyl alcohol or other alcohols, acetones, and/or other solvents. Preferably, the solvents can be readily removed and do not promote undesirable oxidation of the metal powders being milled. Milling temperatures may be ambient or non-ambient and times can range up to several hours or more. Depending on the size of the mixing apparatus, the blended mixtures can range in size from about 100 g to about 2 kg, or smaller or larger.

The blended mixture may be dried to remove the solvent, preferably at a temperature below the flash point of the solvent (e.g., isopropyl alcohol, acetone). The dried powder may be sieved through a 20-mesh screen (or another suitable sieve) to remove large agglomerates. The dried powder may be sintered using any suitable high pressure/high temperature (HP/HT) techniques and equipment, such as those known in the art and discussed above and in the prior art cited in Background section of this application. For example, the powder may be loaded in graphite or refractory metal or other cups (e.g., Ta or Nb). The cups may be loaded into a high pressure cell and subjected to high pressure (such as about 25 to about 75 kilobars) and high temperature (such as greater than about 1000° C.) for a suitable time (such as about 30 to about 40 minutes) to sinter the powder mixture into a coherent compact and, if necessary, braze it to a substrate. Other pressures and temperatures are possible to advance HP/HT sintering, as will be recognized by one of skill in the art. A support material (powder or compact) can be loaded into the cup for in situ bonding to the sintered compact, as is known in this art. Suitable substrates include, for example, refractory metal (e.g., tungsten) carbides. Alternatively, the compositions can be sintered in a non-carbide supported form, or, as in all examples described below, solid, unsupported form. In one embodiment, the sintered compact may have a grain size distribution that is bimodal or multimodal, although other distributions are possible. The size of the cup limits the size of the final sintered compact.

Any suitable sintering method may be used, such as the HP/HT methods described in the Background section of this document. During sintering, the binder phases chemically react with each other and the cBN to produce carbides, nitrides, carbonitrides, oxides, oxynitrides, and borides (e.g. $AlB_2$, AlN, $TiB_2$). The sintering of the mixture may also produce mixed-metal carbides, nitrides, carbonitrides, oxides, oxynitrides, and borides, (e.g. TiAlN, WCoB). These phases can be detected and identified in sintered compacts by X-ray diffraction techniques. The sintered blank may be removed from the cell and machined or otherwise formulated to remove the cup material and to bring it to the desired dimensions.

The finished blank, if sufficiently electrically conductive, can then be cut by into shapes and sizes suitable for the manufacture of cutting tools. Suitable cutting methods include electro-discharge machining (EDM) and other methods. Such tools may be used for machining powder metal iron and/or other materials. If not sufficiently conductive, laser cutting can be used to produce the desired shape for tool fabrication. The size and shape of the described sintered blanks can be varied by changing the dimensions of the components and are primarily limited in dimension by the HP/HT equipment used to promote the sintering process.

As noted above, the compact may have a bimodal or multimodal grain size distribution. For example, in an embodiment, the sintered compact has a course portion of about 40% to about 80% of the cBN and a fine portion of about 20 to about 60% of the cBN, wherein (i) the coarse portion has an average grain size of about 5 to about 30 µm, (ii) the fine portion has an average grain size of about 0 to about 10 µm, and (iii) the ratio of the average grain size of the coarse portion to the average grain size of the fine portion is about 2:1 or greater. Other size distributions are possible.

The sintered cBN compact may be useful in forming tools and tool inserts, such as are used in machining applications. For example, an embodiment of the cBN compacts may be used in heavy machining of cast irons or other chemically reactive materials. As used herein, "heavy machining" refers to applications where relatively large depths of cut are used, often approaching or exceeding 0.10 inches. In an embodiment, sintered cBN compacts may be used with machine cast iron materials that are chemically reactive with cBN, e.g. cast white irons, while maintaining large depths of cut and faster speeds.

Some embodiments of the sintered cBN compacts described herein may be useful in machining large forgings, such as pump housings or impellers, commonly used in the mining industry, e.g., oil extraction, etc. A metric comparing the cBN sintered compacts described herein is the useful life of the tool, which is determined by the quantity of machining it can complete before the surface finish of the machined metal becomes unacceptable. A second metric is the maximum machining speed in surface feet/min at which the tool material can perform in an application. Machining speed is one factor affecting material removal rate and thus impacts overall part fabrication cost. Examples of an embodiment of the cBN sintered compacts described herein have been tested and found to perform better than commercial compacts by a factor of more than 2 to 1 in tool life and enable machining speeds to be increased by as much as 50%.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. For example, although all of the following examples use titanium compounds in the binder phase, it is well know to those skilled in the art that other metals in Groups IV-VI of the periodic table could be substituted for titanium with minimal impact on machining performance. Therefore, it is intended that the invention not be limited to the particular embodiment disclosed as the best mode contemplated for carrying out this invention, but that the invention will include all embodiments falling within the scope of the appended claims. All citations referred herein are expressly incorporated herein by reference.

EXAMPLES

In the examples, two standardized machining tests were conducted on white cast iron workpieces. The two tests were conducted with different grades of white iron and different machining conditions to evaluate the PCBN materials over the broad range that might be seen in various industrial applications. The optimum tool material should perform well in both standardized tests. The conditions of standardized test procedures are given in Table 1. Tool performance was determined by measuring the wear on the flank of the tool after machining approximately 25,000 linear inches of workpiece and is reported below in units of linear inches machined per 0.001" of flank wear. The average of the linear inches per 0.001 inch of flank wear from Test A and Test B was used as the primary metric of tool performance. TABLE 1Test ATest BWorkpiece Composition2.0-2.8% C2.5-3.3% C24-28% Cr16-22% Cr0.6-0.9% Si1.0-3.0% MoRemainderFe1.5-2.0% MnRemainderFeSpeed (surface ft/min) 600350Tool GeometryRNG-432RNG432Feed rate (inches/revolution) 0.0150.015Depth of cut (inches) 0.0100.040

Example 1—Comparative

The standardized machining tests were conducted using a commercial cBN compact (Secomax CBN300, Ã82 volume-% cBN with 15 µm grain size, remainder a ceramic binder comprised predominantly of AlN and $AlB_2$, Seco Tools AB, Sweden). In this example, the material tested appears to have been made in accordance with the teachings of the prior art. The material machined 875 linear inches per 0.001 inch flank wear in Test A and 1230 linear inches per 0.001 inch flank wear in Test B, to give an average performance score of 1053.

Example 2—Comparative

The standardized machining tests are conducted using a commercial cBN compact (BZN 7000, Ã82 vol-% cBN with 15 μm grain size, remainder a ceramic binder comprised predominantly of AlN and AlB$_2$, Diamond Innovations, Inc, Worthington, Ohio). This material machined 760 linear inches per 0.001 inch flank wear in Test A and 1827 linear inches per 0.001 inch flank wear in Test B. to give an average performance score of 1294.

Example 3—Comparative

Titanium carbide (TiC) powder with mean particle size less than about 31 μm, aluminum powder (Al) with a mean particle size of 5 μm, and cBN powder with a with mean particle size of 12 μm are weighed out in a ratio of 71 weight-% cBN, 15 weight-% TiC, and 14 weight-% Al. The components are mixed by tumbling for one hour in a polyethylene jar with isopropyl alcohol as a mixing media. The blended mixture was dried to remove the alcohol at a temperature below the flash point of the alcohol. The dried powder was sieved through a 20-mesh screen to remove large agglomerates and loaded into graphite cups. The cups were loaded into a high pressure cell and subjected to high pressure (45-50 kbars) and high temperature (about 1400° C.) for 30-40 minutes to sinter the powder mixture into a coherent compact.

In the example, the sintered compact was comprised of about 72 volume-% cBN grains with mean size of about 15 microns with the remainder of the material consisting of a ceramic binder phase. The binder phase contained several phases identified by X-ray diffraction techniques to include titanium carbide, aluminum nitride, and aluminum diboride. The latter two phases were formed during the sintering process by reaction of the blended powder components with cBN.

The sintered blank was machined to a thickness of 4.8 mm and laser cut into 0.5-inch discs for fabrication of RNG-432 inserts. Inserts from this material machined 1046 linear inches per 0.001 inch flank wear in Test A and 408 linear inches per 0.001 inch flank wear in Test B, to give an average performance score of 727. In this example, the compact tested was made in accordance with the teachings of the prior art.

Example 4—Comparative

A cBN sintered compact was manufactured in the manner as described in Example 3 from a powder blend comprised of 15 weight-% TiN, 14 weight-% Al, and 71 weight-% cBN with a mean particle size of 12 μm. During sintering, the Al powder and a portion of the TiN reacted with the cBN to form TiB$_2$, TiN, AlN and AlB$_2$, as identified by x-ray diffraction analysis of the sintered compact. Inserts from this material machined 1908 linear inches per 0.001 inch flank wear in Test A and 653 linear inches per 0.001 inch flank wear in Test B, to give an average performance score of 1281. In this example, the compact tested was made in accordance with the teachings of the prior art.

Example 5

An Embodiment of the Invention

A cBN sintered compact was manufactured in the manner as described in Example 3 from a powder blend comprised of 2.6 weight-% TiC, 2.6 weight-% TiN, 2.6 weight-% Al$_2$O$_3$, 11.5 weight-% Al, and 80.7 weight-% cBN with a mean particle size of 12 μm. As Al$_2$O$_3$ contains 53 weight-% elemental aluminum, the total aluminum content in the non-cBN portion of the powder mixture is 67 weight-%. X-ray diffraction analyses of the sintered compact detected the presence of cBN, TiN, TiC, TiB$_2$, AlN, and Al$_2$O$_3$. Inserts from this material machined 1712 linear inches per 0.001 inch flank wear in Test A and 1044 linear inches per 0.001 inch flank wear in Test B, to give an average performance score of 1378. The mixture of carbides, nitrides, borides, and aluminum oxide in the binder of the inventive material produced a PCBN that outperformed the comparative material in Example 3 by nearly 100% and Example 4 by about 8%.

Example 6

An Embodiment of the Invention

A cBN sintered compact was manufactured in the manner as described in Example 3 from a powder blend comprised of 7 weight-% TiC, 15 weight-% Al$_2$O$_3$, 7 weight-% Al, and 71 weight-% cBN with a mean particle size of 12 μm. The total aluminum content in the non-cBN portion of the powder mixture was 52 weight-%. Inserts from this material machined 2800 linear inches per 0.001 inch flank wear in Test A and 1101 linear inches per 0.001 inch flank wear in Test B, to give an average performance score of 1951. The results showed a performance increase when Al$_2$O$_3$ is added to compositions taught in U.S. Pat. No. 6,331,497. It should also be noted that this material outperformed the best commercially available PCBN (i.e. BZN7000 in Example 2) by 50%.

Example 7—Comparative

A cBN sintered compact was manufactured in the manner as described in Example 3 from a powder blend comprised of 7 weight-% TiN, 15 weight-% Al$_2$O$_3$, 7 weight-% Al, and 71 weight-% cBN with a mean particle size of 11 μm. Inserts from this material machined 2980 linear inches per 0.001 inch flank wear in Test A and 777 linear inches per 0.001 inch flank wear in Test B, to give an average performance score of 1879. This material performed very well in Test A but the performance in Test B demonstrates a need for improvement. In this example, the composition tested was made in accordance with the teachings of the prior art.

Example 8

An Embodiment of the Invention

A cBN sintered compact was manufactured in the manner as described in Example 3 from a powder blend comprised of 2.6 weight-% TiC, 2.6 weight-% TiN, 2.6 weight-% Al$_2$O$_3$, 11.5 weight-% Al, and 80.7 weight-% cBN. The cBN powder in this Example had a bimodal particle size distribution with 60% of the cBN having a mean particle size of 12 μm and 40% having a mean particle size of 3 μm. The total aluminum content in the non-cBN portion of the powder mixture was 67 weight-%. X-ray diffraction analyses of the sintered compact detected the presence of cBN, TiN, TiC, TiB$_2$, AlN, and Al$_2$O$_3$. Inserts from this material machined 1938 linear inches per 0.001 inch flank wear in Test A and 2137 linear inches per 0.001 inch flank wear in Test B, to give an average performance score of 2038. The beneficial effect on performance from using a bimodal distribution of cBN grain sizes is easily observed on comparison with Example 5, which gave an average performance score of 1378.

Example 9

An Embodiment of the Invention

A cBN sintered compact is manufactured in the manner as described in Example 3 from a powder blend comprised of 6.1 weight-% TiC, 10.1 weight-% TiN, 2.6 weight-% $Al_2O_3$, 8.0 weight-% Al, and 73.2 weight-% cBN. The cBN powder in this Example had a bimodal particle size distribution with 60% of the cBN having a mean particle size of 12 μm and 40% having a mean particle size of 3 μm. The total aluminum content in the non-cBN portion of the powder mixture was 35 weight-%. X-ray diffraction analyses of the sintered compact detected the presence of cBN, TiN, TiC, $TiB_2$, AlN, and $Al_2O_3$. Inserts from this material machined 2462 linear inches per 0.001 inch flank wear in Test A and 2766 linear inches per 0.001 inch flank wear in Test B, to give an average performance score of 2614. The beneficial effect of carefully selecting the binder composition to improve the chemical resistance of the tool material in addition to the bimodal effect alluded to in Example 8 is evident from this Example.

Example 10—Comparative

Figure 2:
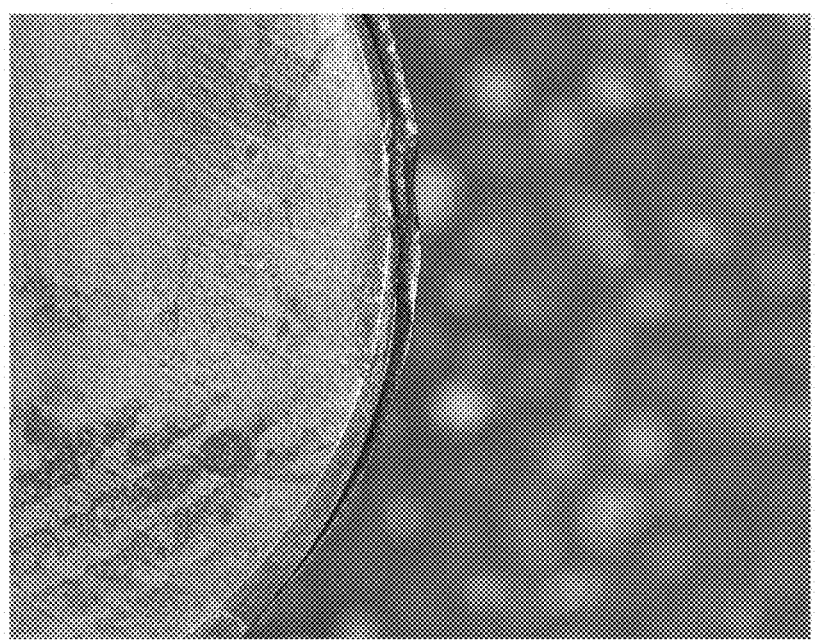
FIG. 2 is a photograph on the wear land of an insert produced according to one embodiment of the present invention after machining a large industrial casting identical to that of FIG. 1.

Commercially available Secomax CBN300 inserts and additional inserts fabricated using the identical procedures and the inventive composition described in Example 8 were subjected to an industrial heavy machining application. Inserts of each material were used to machine one large industrial casting of white iron (28% Cr). The machining was conducted at a speed of 467 surface feet per minute and the depth of cut that varied from 0.070 inch to 0.120 inch. FIG. 1 shows the wear land on a Secomax CBN300 insert after machining one of the large white iron castings, and FIG. 2 shows the wear land on one embodiment of the present invention after machining an identical casting. Thus, we have found embodiments of the inventive tool material to be superior to the commercially available material.

The invention claimed is:

1. A process for making a sintered compact with a cubic boron nitride (cBN) portion and a non cBN portion, which comprises:
   (A) preparing a mixture comprising:
      (a) between about 71 and about 93 volume-% cBN;
      (b) between about 1 and about 20 volume-% of aluminum oxide;
      (c) between about 3 and about 26 volume-% of one or more refractory metal compounds selected from:
         i. a compound having the general formula $MZ_{(1-x)}$;
         ii. a compound having the general formula $MC_{(1-x)}N_x$; and
         iii. a combination or solid solutions of two or more compounds each having the general formula MZ or $MZ_2$, wherein:
            Z is selected from the group consisting of C, B, N and a combination thereof, M is a metal from groups IV-VI of the periodic table, and x is a number between 0.01 and 0.99; and
      (d) between greater than 6 and about 20 volume-% of a source of one or more non-oxide aluminum compounds;
   wherein the total aluminum content in the non cBN portion of the sintered compact exceeds about 30 weight;
   wherein the cBN has a grain size distribution that is at least bimodal having a coarse portion comprising about 40% to about 80% of the cBN and a fine portion comprising about 20 to about 60% of the cBN;
   wherein the coarse portion has an average grain size of about 5 to about 30 μm and the fine portion has an average grain size of about 0 to about 10 μm; and
   wherein the ratio of the average grain size of the coarse portion to the average grain size of the fine portion is about 3:1 or greater; and
   (B) subjecting the mixture to high pressure and high temperature (HP/HT) conditions to produce a sintered compact.

2. The process of claim 1, wherein said HP/HT conditions include a pressure of between about 25 and about 75 kbars, and a temperature of about 1000° C. or higher.

3. The process of claim 1, wherein the cBN has a grain size distribution that is bimodal or multimodal.

4. The process of claim 3, wherein the ratio of the average grain size of the coarse portion to the average grain size of the fine portion is about 2:1.

5. The process of claim 1, further comprising placing a foil or other solid form of aluminum in contact with the powder mixture during sintering.

6. A process for making a sintered compact with a cubic boron nitride (cBN) portion and a non cBN portion comprising:
   (A) preparing a mixture comprising:
      (a) between about 50 and about 93 weight-% of cBN with a bimodal or multimodal grain size distribution;
      (b) between about 1 and about 30 weight-% of aluminum oxide;
      (c) between about 3 and about 46 weight-% of one or more compounds selected from the group consisting of carbides, nitrides, borides, and carbonitrides, all of Groups IV-VI of the periodic table; and
      (d) between greater than 6 and about 20 volume-% of a source of one or more non-oxide aluminum compounds;
   wherein the total aluminum content in the non cBN portion of the sintered compact exceeds about 30 weight;
   wherein the cBN has a grain size distribution that is at least bimodal having a coarse portion comprising about 40% to about 80% of the cBN and a fine portion comprising about 20 to about 60% of the cBN;
   wherein the coarse portion has an average grain size of about 5 to about 30 μm and the fine portion has an average grain size of about 0 to about 10 μm; and
   wherein the ratio of the average grain size of the coarse portion to the average grain size of the fine portion is about 3:1 or greater; and
   (B) subjecting the mixture to high pressure and high temperature (HP/HT) conditions to produce a sintered compact.

7. The process of claim 6, wherein the HP/HT conditions include a pressure of between about 25 and about 75 kbars, and a temperature of about 1000° C. or more.

8. The process of claim 6, wherein the one or more compounds selected from the group consisting of carbides, nitrides, borides, and carbonitrides, comprise carbonitrides of the formula $TiC_{(1-x)}N_x$, or a mixture of at least two materials selected from the group of TiC, TiN, $TiB_2$, $TiN_{(1-x)}$ and $TiC_{(1-x)}N_x$, wherein x is any value between 0.01 and 0.99.

9. The process of claim 6, wherein the ratio of the average grain size of the coarse portion to the average grain size of the fine portion is about 2:1.

10. The process of claim 6, further comprising placing a foil or other solid form of aluminum placed in contact with the powder mixture during high pressure and high temperature sintering.

* * * * *